Patented Apr. 18, 1950

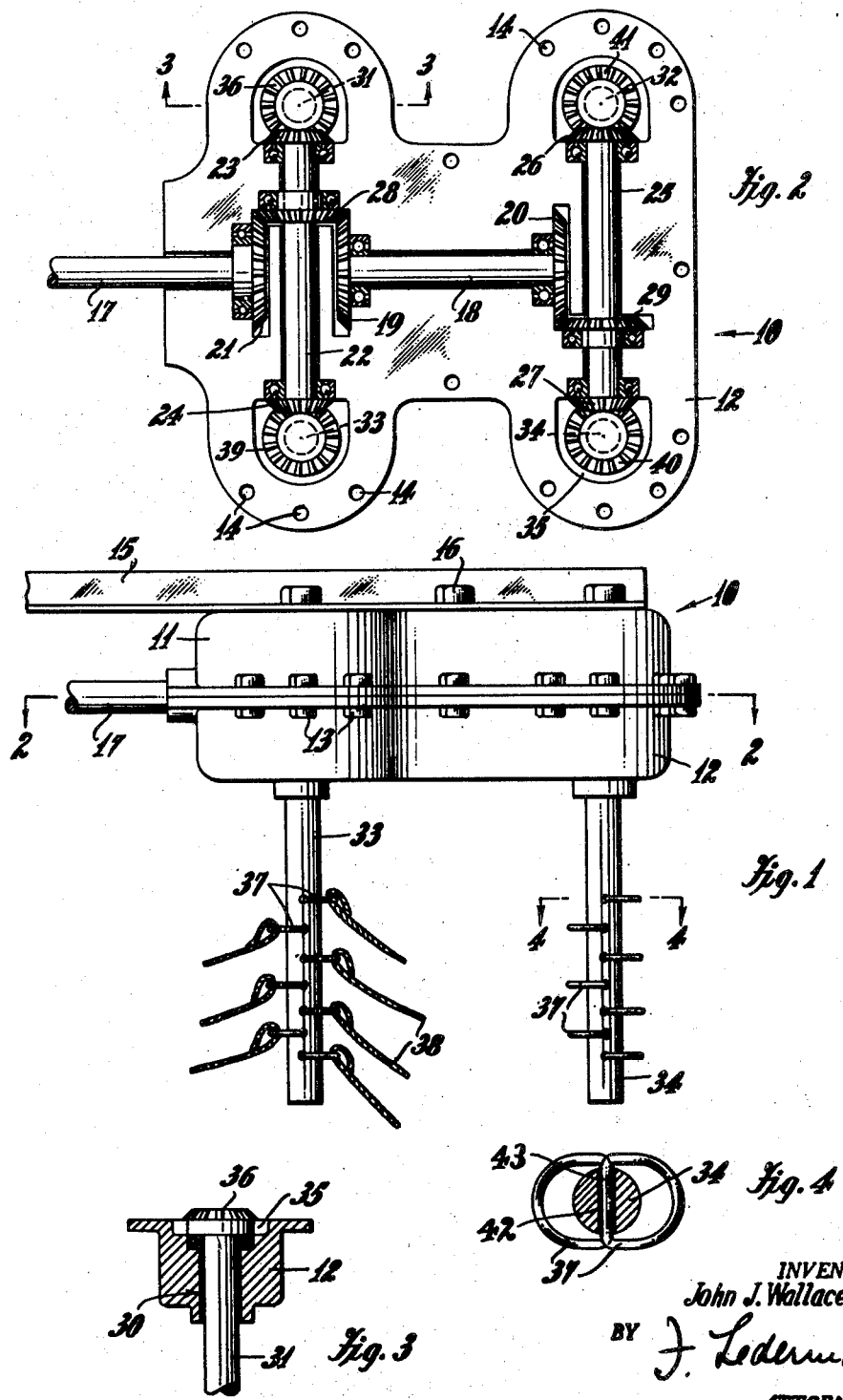

2,504,365

UNITED STATES PATENT OFFICE 2,504,365

FOLIAGE DESTROYING MACHINE AND BEET TOPPER

John J. Wallace, Wilder, Idaho

Application February 24, 1947, Serial No. 730,617

1 Claim. (Cl. 56—289)

This invention relates generally to agricultural machinery or the like, and aims to provide a device or machine in the form of an attachment which may be used for topping beets, for shallow cultivation, or for the destruction of weeds, potato vines, onion tops, etc. The device may be mounted on or attached to any make of tractor, beet lifter or loader, or on any type of machine that would function more efficiently by having the foliage destroyed either before or during its operation, and any suitable driving means such as, for example, the power take-off of a tractor, may be used to operate the attachment.

Another object of the invention is the provision of a plurality of spaced substantially or approximately vertical spindles having flail-like ropes, chains, or the like tied thereto in vertically spaced relationship, together with means for rapidly rotating the spindles whose lower extremities remain at an elevation above the ground, so that as the machine advances the flail-like action of the said ropes, chains, or the like destroys the foliage of the plants which extends above the ground.

The above and additional and more detailed objects will become apparent in the following description wherein characters of reference refer to like-numbered parts in the accompanying drawing. It is to be noted that the drawing is intended for the purpose of illustration only and that it is neither desired nor intended to limit the invention to any or all of the specific details of construction shown excepting insofar as they may be deemed essential to the invention.

Referring briefly to the drawing, Fig. 1 is a side elevational view of the attachment per se.

Fig. 2 is a sectional view taken on the line 2—2 of Fig. 1.

Fig. 3 is a sectional view taken on the line 3—3 of Fig. 2.

Fig. 4 is an enlarged sectional view taken on the line 4—4 of Fig. 1.

Referring in detail to the drawing, the numeral 10 indicates a housing formed of two complementary half sections 11 and 12 adapted to be held together by bolts 13 passing through holes 14. The numeral 15 indicates any horizontal support or frame such as may be found on a tractor, to which the housing 10 is bolted by bolts 16 and from which, therefore, the housing 10 is supported.

One end of a drive shaft 17 enters the housing 10 from one side, and this shaft is adapted to be driven by any suitable means, such as, for instance, the power take-off of a tractor, not shown.

In alignment with the shaft 17 is a stub shaft 18 positioned centrally in the housing. Bevel gears 19 and 20 are provided on the ends of the shaft 18, and a bevel gear 21 is provided on the shaft 17.

Positioned between the juxtaposed ends of the shafts 17 and 18, and at right angles to these shafts, is a stub shaft 22 having bevel gears 23 and 24 on the ends thereof, and an intermediate bevel gear 28 thereon. Spaced from the bevel gear 20 and at right angles to the shaft 18, is a shaft 25 having bevel gears 26 and 27 on its ends, and an intermediate bevel gear 29 thereon.

Openings 30 are provided through the housing section 12 at both extremities of the shafts 23 and 25. Substantially or approximately vertical spindles 31, 32, 33, and 34 are suspended from these openings by enlarged upper ends or flanges 35, which are cut into bevel gears 36, 39, 40, and 41. These spindles are provided with vertically spaced transverse openings 42 therethrough all lying in a common plane. A plurality of yokes 37 is provided, each having a cross-member 43 joining the extremities of its arms and passing loosely and hence pivotally through one of the openings 42. The yokes are positioned alternately on opposite sides of the spindle, as shown, and the ends of lengths of rope, chain, or the like are secured to the yokes.

The bevel gear 36 is in mesh with the gear 33; likewise, the bevel gear 39 meshes with the gear 24, the bevel gear 40 meshes with the gear 27, and the bevel gear 41 meshes with gear 26. The bevel gear 20 of the shaft 18 meshes with the bevel gear 29 of the shaft 25. Hence, rotation of the drive shaft 17 causes rotation of the four spindles 31, 32, 33, and 34 shown.

It is apparent that, when the attachment illustrated is supported above the ground in such a position, for instance, in two furrows of a farm, with the foliage to be destroyed being positioned in the adjacent hills, and the shaft 17 is rapidly rotated as previously stated, the spindles 31, 32, 33, and 34 will likewise rotate rapidly and will by centrifugal force swing the ropes 38 through approximately horizontal planes. As the ropes 38 strike the foliage they sever or destroy it, thus clearing the ground.

Obviously, modifications in form and structure may be made without departing from the spirit and scope of the invention.

I claim:

In a device of the class described, a spindle adapted to be rotated rapidly, said spindle having a plurality of longitudinally spaced diametrical openings therethrough lying in a common plane, a like plurality of yokes, each of said yokes having a cross-arm at right angles to and joining the extremities of the arms of the yoke and registering pivotally in one of said openings, said yokes having flail-like members secured thereto, said yokes being arranged in staggered relationship along the length of the spindle so that any two yokes of each pair of mutually adjacent yokes extend from mutually opposite sides of the spindle.

JOHN J. WALLACE.

REFERENCES CITED

The following references are of record in the file of this patent:

UNITED STATES PATENTS

| Number | Name | Date |
|---|---|---|
| 1,263,965 | Twitchell | Apr. 23, 1918 |
| 2,341,486 | Swertfeger | Feb. 8, 1944 |

FOREIGN PATENTS

| Number | Country | Date |
|---|---|---|
| 802,669 | France | June 13, 1936 |